(12) United States Patent
Shimizu et al.

(10) Patent No.: US 8,530,092 B2
(45) Date of Patent: *Sep. 10, 2013

(54) NON-AQUEOUS ELECTROLYTE SECONDARY BATTERY

(75) Inventors: Noriyuki Shimizu, Moriguchi (JP);
Hideki Kitao, Sakaiminato (JP);
Yoshinori Kida, Moriguchi (JP)

(73) Assignee: Sanyo Electric Co., Ltd., Osaka (JP)

( * ) Notice: Subject to any disclaimer, the term of this patent is extended or adjusted under 35 U.S.C. 154(b) by 10 days.

This patent is subject to a terminal disclaimer.

(21) Appl. No.: 13/533,620

(22) Filed: Jun. 26, 2012

(65) Prior Publication Data

US 2012/0328948 A1    Dec. 27, 2012

Related U.S. Application Data

(62) Division of application No. 13/067,095, filed on May 6, 2011, now Pat. No. 8,227,113, which is a division of application No. 11/703,831, filed on Feb. 8, 2007, now Pat. No. 7,955,734.

(30) Foreign Application Priority Data

Feb. 8, 2006  (JP) ................................. 2006-031166
Mar. 30, 2006  (JP) ................................. 2006-093957

(51) Int. Cl.
*H01M 4/02* (2006.01)

(52) U.S. Cl.
USPC ...................... 429/223; 429/231.95; 429/224

(58) Field of Classification Search
None
See application file for complete search history.

(56) References Cited

U.S. PATENT DOCUMENTS

| 2003/0087154 A1 | 5/2003 | Ohzuka et al. ............. 429/231.1 |
| 2003/0108793 A1 | 6/2003 | Dahn et al. ..................... 429/224 |
| 2003/0180620 A1 | 9/2003 | Nakane et al. ........... 429/231.95 |
| 2004/0234854 A1 | 11/2004 | Kang et al. .................. 429/231.1 |
| 2004/0234857 A1 | 11/2004 | Shiozaki et al. ........... 429/231.3 |
| 2007/0207383 A1 | 9/2007 | Ohzuka et al. ................ 429/223 |

FOREIGN PATENT DOCUMENTS

| CN | 1447462 A |   | 10/2003 |
| JP | 11016571 A | * | 1/1999 |

OTHER PUBLICATIONS

Neudecker et al., Lithium Manganese Nickel Oxides $Li_x(Mn_yNi_{1-y})_{2-x}O_2$: Synthesis and Characterization of Thin Films and Bulk Phases; Dec. 1998; Journal of Electrochemistry Society; vol. 145, No. 12, pp. 4148-4159.

* cited by examiner

*Primary Examiner* — Maria J Laios
(74) *Attorney, Agent, or Firm* — McDermott Will & Emery LLP

(57) ABSTRACT

A non-aqueous electrolyte secondary battery has a positive electrode containing a positive electrode active material, a negative electrode containing a negative electrode active material, and a non-aqueous electrolyte. The positive electrode active material includes a lithium-nickel-manganese composite oxide having a hexagonal layered rock-salt structure that belongs to the space group R-3m, and contains lithium in 3b sites that contain transition metals. The lithium-nickel-manganese composite oxide is represented by the molecular formula $Li[Li_xNi_yMn_zM_b]O_{2-a}$, where: $0.2<x<0.4$, $0.12<y<0.5$, $0.3<z<0.62$, and $0 \leq a<0.5$; M is at least one of Mg, Al, Zr, Ti, Nb, W, and Mo; and variables x, y, z, and b satisfy the expressions $x>(1-2y)/3$, $\frac{1}{4} \leq y/z \leq 1.0$, $0<b/(y+z) \leq 0.1$, and $1.0 \leq x+y+z+b \leq 1.1$.

2 Claims, 7 Drawing Sheets

NON-AQUEOUS ELECTROLYTE SECONDARY BATTERY

This application is a divisional application of Ser. No. 13/067,095, filed May 6, 2011, Now U.S. Pat. No. 8,227,113, which is a divisional application of Ser. No. 11/703,831, filed Feb. 8, 2007, now U.S. Pat. No. 7,955,734, which claims priority based on Japanese Patent Application Nos. 2006-031166 and 2006-093957, filed Feb. 8, 2006, and Mar. 30, 2006, respectively, and which are incorporated herein by reference.

BACKGROUND OF THE INVENTION

1. Field of the Invention

The present invention relates to non-aqueous electrolyte secondary batteries that use as a positive electrode active material a lithium-containing transition metal oxide containing nickel and manganese as transition metals.

2. Description of Related Art

In recent years, development of HEVs (Hybrid Electric Vehicles), which use electric motors in conjunction with automobile gasoline engines, has been in progress worldwide in order to resolve the environmental issues caused by vehicle emissions. Nickel-hydrogen secondary batteries have conventionally been used as power sources for the HEVs, but lithium-ion secondary batteries have been expected to be applied as HEV power sources because of their higher voltage and capacity.

One of the important issues relating to a lithium-ion secondary battery for HEV applications is to reduce the costs. Lithium-ion secondary batteries that have already been commercially available for power supply applications of portable electronic devices such as mobile telephones, camcorders, and notebook computers generally use a composite oxide containing Co as the positive electrode active material. However, because of cost considerations, positive electrode materials that do not contain costly metal elements such as Co are desirable for the large-sized lithium-ion secondary batteries for HEVs. For HEV applications, higher input power is preferable from the viewpoint of system design particularly for the purpose of efficient battery regeneration. Accordingly, a battery with low charge-discharge voltage is needed, and in addition, a battery that achieves a good balance between input power and output power is desirable. In particular, in HEV applications, not all the capacity range of the battery is evenly used but the charge range in the vicinity of 50% SOC is mainly used. Therefore, the design requirements are that the battery should have low charge-discharge voltages in that range and exhibits a good balance between input power and output power. A problem with conventionally used active materials, such as lithium cobalt oxide ($LiCoO_2$), lithium nickel oxide ($LiNiO_2$), lithium-manganese oxide ($LiMn_2O_4$), and Li—Ni—Co—Mn composite oxide, is, however, that these materials cause the positive electrode potential to be high, and thus lead to high battery voltage, resulting in low input power. In view of such circumstances, a low-cost, low-voltage lithium-ion secondary battery designed to exhibit excellent power characteristics is sought after for HEN applications.

In recent years, active materials that are made of only elements that can be obtained at relatively low cost, such as lithium-containing olivine-type phosphate and Ni—Mn-based composite oxide, have been investigated widely as positive electrode to materials for lithium-ion secondary batteries for HEV applications that can meet the above-mentioned requirements. Among them, a Li(Li—Ni—Mn) composite oxide having a crystal structure that belongs to the space group R-3m and containing lithium at the transition metal site enables the charge-discharge potential at 50% is SOC to be about 100 mV to 200 mV lower than those of the above-described positive electrode materials that have already been in commercial use, because lithium extraction from the 3b sites occurs during an initial charge at 4.45 V (vs. $Li/Li^+$) or higher and, after this reaction, the capacity originating from the oxidation-reduction reaction of $Mn^{3+}/Mn^{4+}$ is obtained at 3.5 V (vs. $Li/Li^+$) or lower. Because of these properties, the Li(Li—Ni—Mn) composite oxide has drawn attention as a promising positive electrode material that achieves high capacity and higher input power at low cost. (See, for example, U.S. Patent Application Publication No. 2003/0108793A1).

Nevertheless, the Li(Li—Ni—Mn) composite oxide disclosed in the just-mentioned publication shows a high irreversible capacity during the initial charge, so the initial charge-discharge efficiency of the positive electrode active material is poor. This necessitates excessive use of the negative electrode active material in the battery design, which leads to problems such as a low battery capacity and poor load characteristics.

BRIEF SUMMARY OF THE INVENTION

It is an object of the present invention to provide a non-aqueous electrolyte secondary battery that uses, as its positive electrode active material, a lithium-transition metal composite oxide containing nickel and manganese as transition metals, such that the battery achieves a good balance between input power and output power, exhibits excellent power characteristics, and moreover has a high initial charge-discharge efficiency and a high discharge capacity.

The present invention provides a non-aqueous electrolyte secondary battery comprising: a positive electrode containing a positive electrode active material; a negative electrode containing a negative electrode active material; and a non-aqueous electrolyte, wherein the positive electrode active material comprises a lithium-nickel-manganese composite oxide having a hexagonal layered rock-salt structure that belongs to the space group R-3m and containing lithium in 3b sites that contain transition metals, the lithium-nickel-manganese composite oxide being represented by the molecular formula $Li[(Li_xNi_yMn_z)]O_{2-a}$ where: $0<x<0.4$, $0.12<y<0.5$, $0.3<z<0.62$, and $0 \leq a<0.5$; and the variables x, y, and z satisfy the expressions $x>(1-2y)/3$, $1/4 \leq y/z \leq 1.0$, and $x+y+z=1.0$.

According to the present invention, the positive electrode active material comprises the lithium-nickel-manganese composite oxide having a hexagonal layered rock-salt structure that belongs to the space group R-3m and containing lithium in the 3b sites that contain the transition metals, and the lithium-nickel-manganese composite oxide is represented by the molecular formula described above. The use of this positive electrode active material makes it possible to provide a non-aqueous electrolyte secondary battery that achieves a good balance between input power and output power, exhibits excellent power characteristics, and moreover has high initial charge-discharge efficiency and a high discharge capacity.

DETAILED DESCRIPTION OF THE INVENTION

Figure 1:
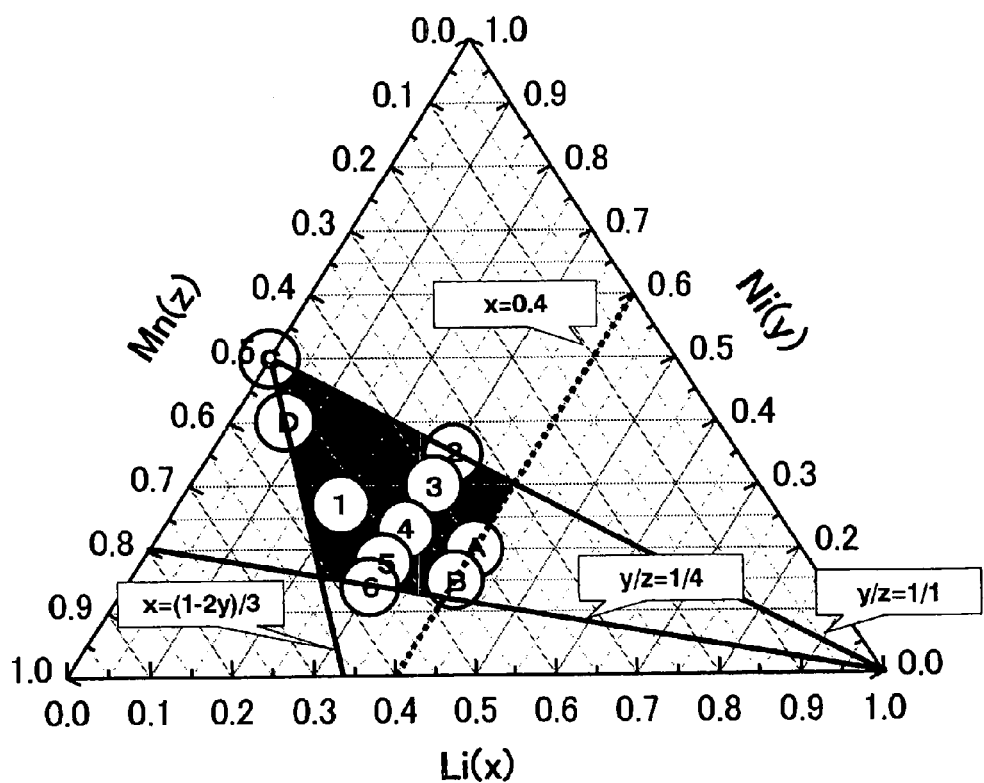
FIG. 1 is a three-phase diagram illustrating the composition region of Li—Ni—Mn in the lithium-nickel-manganese composite oxide according to the present invention.

A non-aqueous electrolyte secondary battery according to the present invention comprises a positive electrode containing a positive electrode active material, a negative electrode containing a negative electrode active material, and a non-aqueous electrolyte. The positive electrode active material comprises a lithium-nickel-manganese composite oxide having a hexagonal layered rock-salt structure that belongs to the space group R-3m and containing lithium in 3b sites that contain transition metals. The lithium-nickel-manganese composite oxide is represented by the molecular formula $Li[Li_xNi_yMn_z]O_{2-a}$ where: $0<x<0.4$, $0.12<y<0.5$, $0.3<z<0.62$, and $0 \leq a<0.5$; and the variables x, y, and z satisfy the expressions $x>(1-2y)/3$, $1/4 \leq y/z \leq 1.0$, and $x+y+z=1.0$.

In the present invention, the lithium-nickel-manganese composite oxide containing lithium in 3b sites and being represented by the above-specified compositional formula is used as the positive electrode active material. The use of such a lithium-nickel-manganese composite oxide as the positive electrode active material makes it possible to provide a non-aqueous electrolyte secondary battery that achieves a good balance between input power and output power, exhibits excellent power characteristics, and moreover has high initial charge-discharge efficiency and a high discharge capacity.

In the lithium-nickel-manganese composite oxide $Li[Li_xNi_yMn_z]O_{2-a}$ of the present invention, the variable x, which represents the amount of Li contained in the 3b sites containing the transition metals, is within the range $0<x<0.4$; the variable y, which represents the amount of Ni in the lithium-nickel-manganese composite oxide, is within the range $0.12<y<0.5$; the variable z, which represents the amount of Mn in the lithium-nickel-manganese composite oxide, is within the range $0.3<z<0.62$; the variable a, which represents the amount of oxygen defects, is within the range $0 \leq a<0.5$; and the variables x, y, and z satisfy the expressions $x>(1-2y)/3$, $1/4 \leq y/z \leq 1.0$, and $x+y+z=1.0$. When the variables x, y, z, and a are within the just-described ranges and the variables x, y, and z satisfy the just-described expressions, the battery exhibits higher initial charge-discharge efficiency and higher discharge capacity and achieves better regenerative power characteristics than batteries using conventional lithium-nickel-manganese composite oxides.

In particular, it is preferable that the variables x, y, and z be within the following ranges $0.2<x<0.4$, $0.3<y<0.4$, $0.4<z<0.62$, and $1/4 \leq y/z \leq 1/2$, from the viewpoint of increasing the amount of lithium that is extracted from the 3b sites during the initial charge and widening the redox region for $Mn^{4+/3+}$, so as to lower the charge-discharge potentials, for the purpose of enhancing the regenerative power characteristics.

The lithium-nickel-manganese composite oxide of the present invention may further contain at least one metal element M having a valency of from 2 to 6. Specifically, the lithium-nickel-manganese composite oxide may further contain, for example, B, Mg, Al, Si, P, Ca, Sc, Ti, V, Cr, Fe, Co, Cu, Zn, Ga, Ge, As, Sr, Y, Zr, Nb, Mo, Tc, Ru, Rh, Pd, In, Sn, Sb, Te, Ba, a lanthanoide element, Hf, Ta, W, Re, Os, Ir, Pt, Pb, Bi, Ra, and an actinoid element. It is preferable that the mole ratio of the added metal element M be 0.1 or less with respect to the transition metal elements contained in the transition metal sites 3b, and more preferably from 0.001 to 0.05. Accordingly, in accordance with another aspect, the present invention provides a non-aqueous electrolyte secondary battery comprising a positive electrode containing a positive electrode active material, a negative electrode containing a negative electrode active material, and a non-aqueous electrolyte, wherein the positive electrode active material comprises a lithium-nickel-manganese composite oxide having a hexagonal layered rock-salt structure that belongs to the space group R-3m and containing lithium in the 3b sites containing transition metals, the lithium-nickel-manganese composite oxide being represented by the molecular formula $Li[Li_xNi_yMn_zM_b]O_{2-a}$ where: $0<x<0.4$, $0.12<y<0.5$, $0.3<z<0.62$, and $0 \leq a<0.5$; M is at least at least one metal element having a valency of from 2 to 6; and the variables x, y, z, and b satisfy the expressions $x>(1-2y)/3$, $1/4 \leq y/z \leq 1.0$, $0<b/(y+z) \leq 0.1$, and $1.0 \leq x+y+z+b \leq 1.1$.

It is particularly preferable that the metal element M in the molecular formula be at least one element selected from the group consisting of Mg, Al, Zr, Ti, Nb, W, and Mo.

In the lithium-nickel-manganese composite oxide having a hexagonal layered rock-salt structure that belongs to the space group R-3m and containing lithium in 3b sites that contain transition metals, and being represented by the molecular formula $Li[Li_xNi_yMn_2]O_{2-a}$ according to the present invention, it is preferable that the amount of lithium in the 3b sites be determined using an x-ray diffraction analysis or a neutron diffraction analysis. In this case, the advantageous effects of the present invention can be obtained also when the crystal structure belongs to $P3_112$, other than R-3m, since Meng and others advocate that Mn surrounds Li when Li occupies the 3b site and reported that the space group is restored at P3, 12 from R-3m (Y. S. Meng, G. Ceder, C. P. Grey, W. S. Yoon and Y. Shao-Horn, *Electrochem. and Solid-State Lett.*, Volume 7, Issue 6, previously presented. A155-A158 (2004)).

In the non-aqueous electrolyte secondary battery of the present invention, it is preferable that the capacity ratio of the negative electrode to the positive electrode (negative electrode charge capacity/positive electrode charge capacity) is 1.0 or greater when the battery is charged until the potential of the positive electrode reaches 4.45 V (vs. Li/Li$^+$ or higher, and more preferably, the capacity ratio is within the range of from 1.0 to 1.2. That is, it is preferable that the non-aqueous electrolyte secondary battery of the present invention be charged until the potential of the positive electrode reaches 4.45 V (vs. Li/Li$^+$) or higher when used. Therefore, when a carbon material such as graphite is used as the negative electrode active material, it is preferable that the end-of-charge voltage of the battery be set at 4.35 V or higher. It is more preferable that the battery be charged until the potential of the positive electrode reaches 4.45 V to 4.80 V (vs. Li/Li$^+$). Accordingly, when a carbon material is used as the negative electrode active material, it is preferable that the end-of-charge voltage be set at a voltage of from 4.35 V to 4.70 V.

In the present invention, the solute of the non-aqueous electrolyte may be any lithium salt that is generally used as a solute in non-aqueous electrolyte secondary batteries. Examples of the lithium salt include $LiPF_6$, $LiBF_4$, $LiCF_3SO_3$, $LiN(CF_3SO_2)_2$, $LiN(C_2F_5SO_2)_2$, $LiN(CF_3SO_2)$ ($C_4F_9SO_2$), $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$, and mixtures thereof. In addition to these salts, the non-aqueous electrolyte may contain a lithium salt having an oxalato complex as anions, and more preferably, the non-aqueous electrolyte may contain lithium-bis(oxalato)borate.

The solvent of the non-aqueous electrolyte used in the present invention may be any solvent that has conventionally been used as a solvent for an electrolyte in non-aqueous electrolyte secondary batteries. Examples of the solvent include: cyclic carbonates, such as ethylene carbonate, propylene carbonate, butylene carbonate, and vinylene carbonate; and chain carbonates, such as dimethyl carbonate, methylethyl carbonate, and diethyl carbonate. Particularly preferable is a mixed solvent of a cyclic carbonate and a chain carbonate.

Although the negative electrode active material is not particularly limited in the present invention, it is preferable that the negative electrode active material be a carbon material in which the lithium intercalation and deintercalation associated with charge-discharge operations are reversibly performed.

EXAMPLES

Hereinbelow, the present invention is described in further detail based on examples thereof. It should be understood, however, that the present invention is not limited to the following examples but various changes and modifications are possible without departing from the scope of the invention.

Example 1

Preparation of Positive Electrode Active Material

A Li(LiNiMn)$O_2$ composite oxide was prepared in the following manner. A 1M sodium hydroxide solution was added to an aqueous solution of 0.5M nickel acetate and 1.0M manganese acetate so that hydroxides of Ni and Mn were coprecipitated, to obtain a composite hydroxide of Ni and Mn. Using the composite hydroxide thus obtained, $Li_2CO_3$ and the Ni—Mn composite hydroxide were mixed so that the mole ratio of the elements Li:Ni:Mn became 1.20:0.27:0.53. The resultant mixture was pre-sintered in an air atmosphere at 500° C. for 10 hours and thereafter sintered at 1000° C. for 20 hours, to thus obtain the Li(LiNiMn)$O_2$ composite oxide. The resultant Li(LiNiMn)$O_2$ composite oxide had a composition of Li[$Li_{0.20}Ni_{0.27}Mn_{0.53}$]$O_2$.

Preparation of Positive Electrode

A positive electrode was prepared in the following manner. The positive electrode active material prepared in the just-described manner was mixed with acetylene black as a conductive agent and an N-methyl-2-pyrrolidone solution in which polyvinylidene fluoride as a binder agent was dissolved so that the weight ratio of the positive electrode active material and the conductive agent and the binder agent became 90:5:5, and the mixture was then kneaded to prepare a positive electrode slurry. The resultant slurry was applied onto an aluminum foil serving as a current collector and thereafter dried. Thereafter, the resultant material was pressure-rolled using pressure rollers, and a current collector tab was attached thereto, whereby the positive electrode was prepared.

Preparation of Electrolyte Solution

An electrolyte solution was prepared in the following manner. $LiPF_6$ as a solute was dissolved in a solvent of a 3:3:4 volume ratio mixture of ethylene carbonate (EC), methyl ethyl carbonate (MEC), and dimethyl carbonate (DMC) at a concentration of 1 mole/liter, and 1 weight % of vinylene carbonate (VC) was further dissolved therein as a surface-film forming agent.

Preparation of Three-electrode Beaker Cell

Figure 7:
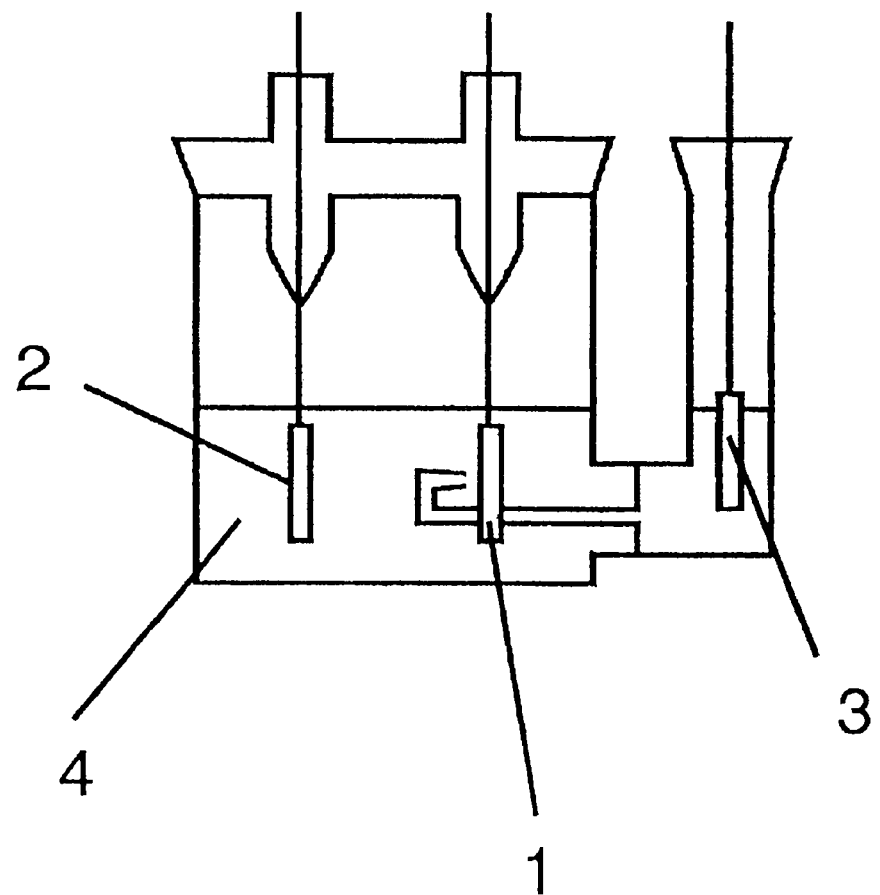
FIG. 7 is a schematic cross-sectional view illustrating a three-electrode beaker cell.

Using the positive electrode and the electrolyte solution prepared in the above-described manner, a three-electrode beaker cell as illustrated in FIG. 7 was prepared in a glove box under an argon atmosphere. As illustrated in FIG. 7, an electrolyte solution 4 was filled in the beaker, and a working electrode 1, a counter electrode 2, and a reference electrode 3 were put in the electrolyte solution 4. The foregoing positive electrode was used as the working electrode 1, and metallic lithium was used for the counter electrode 2 and the reference electrode 3 to prepare the cell 1.

Charge-Discharge Test

At room temperature, the cell was charged at 1 mA to 4.6 V (vs. Li/Li$^+$), then rested for 10 minutes, and thereafter discharged at 1 mA to 2.0 V (vs. Li/Li$^+$). The charge-discharge efficiency in this cycle was defined as the initial charge-discharge efficiency, and the measurements of the initial charge-discharge efficiency and the discharge capacity were obtained.

I-V Resistance Measurement Test

The input I-V resistance of the cell was determined by the following test.
1) 1 mA charge (10 seconds)→rest (5 minutes)→1 mA discharge (10 seconds)→rest (5 minutes)
2) 5 mA charge (10 seconds)→rest (5 minutes)→1 mA discharge (50 seconds)→rest (5 minutes)
3) 10 mA charge (10 seconds)→rest (5 minutes)→1 mA discharge (100 seconds)→rest (5 minutes)
4) 20 mA charge (10 seconds)→rest (5 minutes)→1 mA discharge (200 seconds)→rest (5 minutes)

The above charge-discharge tests 1) to 4) were conducted sequentially at room temperature. The potential of the cell was measured 10 seconds after each of the charging operations. I-V resistance was determined from the slope of the measured potential values versus the current values, and open circuit potential (OCP) was found from the intercepts.

From the obtained I-V resistance and OCP, an input power value was calculated using the following equation.

Input power(W)=(4300−OCP)/I-V resistance×4300

The output I-V resistance was determined by the following test.
1) 1 mA discharge (10 seconds)→rest (5 minutes)→1 mA charge (10 seconds)→rest (5 minutes)
2) 5 mA discharge (10 seconds)→rest (5 minutes)→1 mA charge (50 seconds)→rest (5 minutes)
3) 10 mA discharge (10 seconds)→rest (5 minutes)→1 mA charge (100 seconds)→rest (5 minutes)
4) 20 mA discharge (10 seconds)→rest (5 minutes)→1 mA charge (200 seconds)→rest (5 minutes)

The above charge-discharge tests 1) to 4) were conducted sequentially at room temperature. The potential of the cell was measured 10 seconds after each of the charging operations. The I-V resistance was determined from the slope of the measured potential values versus the current values, and the OCP was found from the intercepts.

From the obtained I-V resistance and OCP, an output power value was calculated using the following equation.

Output power(W)=(OCP−2000)/I-V resistance×2000

Using the charge and output power values calculated from the above equations, an input/output power ratio of the cell was calculated according to the following equation.

Input/output power ratio=Input power/Output power

Example 2

A positive electrode active material was prepared in a similar manner to that described in Example 1, except that the $Li_2CO_3$ and the Ni—Mn composite hydroxide were mixed so that the mole ratio of the elements Li:Ni:Mn became 1.30:0.35:0.35, and thus, $Li[Li_{0.30}Ni_{0.35}Mn_{0.35}]O_2$ was obtained. Subsequently, using the positive electrode active material thus prepared, a three-electrode beaker cell 2 was fabricated in the same manner as described in Example 1, and using the resultant cell, the charge-discharge tests were conducted to obtain test results.

Example 3

A positive electrode active material was prepared in a similar manner to that described in Example 1, except that the $Li_2CO_3$ and the Ni—Mn composite hydroxide were mixed so that the mole ratio of the elements Li:Ni:Mn became 1.30:0.30:0.40; and thus, $Li[Li_{0.30}Ni_{0.30}Mn_{0.40}]O_2$ was obtained. Subsequently, using the positive electrode active material thus prepared, a three-electrode beaker cell 3 was fabricated in the same manner as described in Example 1, and using the resultant cell, the charge-discharge tests were conducted to obtain test results.

Example 4

A positive electrode active material was prepared in a similar manner to that described in Example 1, except that the $Li_2CO_3$ and the Ni—Mn composite hydroxide were mixed so that the mole ratio of the elements Li:Ni:Mn became 1.30:0.23:0.47, and thus, $Li[Li_{0.30}Ni_{0.23}Mn^{0.47}]O_2$ was obtained. Subsequently, using the positive electrode active material thus prepared, a three-electrode beaker cell 4 was fabricated in the same manner as described in Example 1, and using the resultant cell, the charge-discharge tests were conducted to obtain test results.

Example 5

A positive electrode active material was prepared in a similar manner to that described in Example 1, except that the $Li_2CO_3$ and the Ni—Mn composite hydroxide were mixed so that the mole ratio of the elements Li:Ni:Mn became 1.30:0.18:0.52, and thus, $Li[Li_{0.30}Ni_{0.18}Mn_{0.52}]O_2$ was obtained. Subsequently, using the positive electrode active material thus prepared, a three-electrode beaker cell 5 was fabricated in the same manner as described in Example 1, and using the resultant cell, the charge-discharge tests were conducted to obtain test results.

Example 6

A positive electrode active material was prepared in a similar manner to that described in Example 1, except that the $Li_2CO_3$ and the Ni—Mn composite hydroxide were mixed so that the mole ratio of the elements Li:Ni:Mn became 1.30:0.14:0.56, and thus, $Li[Li_{0.30}Ni_{0.14}Mn_{0.56}]O_2$ was obtained. Subsequently, using the positive electrode active material thus prepared, a three-electrode beaker cell 6 was fabricated in the same manner as described in Example 1, and using the resultant cell, the charge-discharge tests were conducted to obtain test results.

Example 7

A positive electrode active material was prepared in a similar manner to that described in Example 1, except that $Li_2CO_3$, the Ni—Mn composite hydroxide, and $4MgCO_3 \cdot Mg(OH)_2 \cdot 5H_2O$ were mixed so that the mole ratio of the elements Li:Ni:Mn:Mg became 1.3:0.23:0.47:0.0035, and thus, $Li[Li_{0.30}Ni_{0.23}Mn_{0.47}Mg_{0.0035}]O_2$ was obtained. Subsequently, using the positive electrode active material thus prepared, a three-electrode beaker cell 7 was fabricated in the same manner as described in Example 1, and using the resultant cell, the charge-discharge tests were conducted to obtain test results.

Example 8

A positive electrode active material was prepared in a similar manner to that described in Example 1, except that $Li_2CO_3$, the Ni—Mn composite hydroxide, and $4MgCO_3 \cdot Mg(OH)_2 \cdot 5H_2O$ were mixed so that the mole ratio of the elements Li:Ni:Mn:Mg became 1.3:0.23:0.47:0.007, and thus, $Li[Li_{0.30}Ni_{0.23}Mn_{0.47}Mg_{0.007}]O_2$ was obtained. Subsequently, using the positive electrode active material thus prepared, a three-electrode beaker cell 8 was fabricated in the same manner as described in Example 1, and using the resultant cell, the charge-discharge tests were conducted to obtain test results.

Example 9

A positive electrode active material was prepared in a similar manner to that described in Example 1, except that $Li_2CO_3$, the Ni—Mn composite hydroxide, and $4MgCO_3 \cdot Mg(OH)_2 \cdot 5H_2O$ were mixed so that the mole ratio of the elements Li:Ni:Mn:Mg became 1.3:0.23:0.47:0.014, and thus, $Li[Li_{0.30}Ni_{0.23}Mn_{0.47}Mg_{0.014}]O_2$ was obtained. Subsequently, using the positive electrode active material thus prepared, a three-electrode beaker cell 9 was fabricated in the same manner as described in Example 1, and using the resultant cell, the charge-discharge tests were conducted to obtain test results.

Example 10

A positive electrode active material was prepared in a similar manner to that described in Example 1, except that $Li_2CO_3$, the Ni—Mn composite hydroxide, and $Al(OH)_3$ were mixed so that the mole ratio of the elements Li:Ni:Mn:Al became 1.3:0.23:0.47:0.0035, and thus, $Li[Li_{0.30}Ni_{0.23}Mn_{0.47}Al_{0.0035}]O_2$ was obtained. Subsequently, using the positive electrode active material thus prepared, a three-electrode beaker cell 10 was fabricated in the same manner as described in Example 1, and using the resultant cell, the charge-discharge tests were conducted to obtain test results.

Example 11

A positive electrode active material was prepared in a similar manner to that described in Example 1, except that $Li_2CO_3$, the Ni—Mn composite hydroxide, and $Al(OH)_3$ were mixed so that the mole ratio of the elements Li:Ni:Mn:Al became 1.3:0.23:0.47:0.007, and thus, $Li[Li_{0.30}Ni_{0.23}Mn_{0.47}Al_{0.007}]O_2$ was obtained. Subsequently, using the positive electrode active material thus prepared, a three-electrode beaker cell 11 was fabricated in the same manner as described in Example 1, and using the resultant cell, the charge-discharge tests were conducted to obtain test results.

Example 12

A positive electrode active material was prepared in a similar manner to that described in Example 1, except that $Li_2CO_3$, the Ni—Mn composite hydroxide, and $Al(OH)_3$ were mixed so that the mole ratio of the elements Li:Ni:Mn:Al became 1.3:0.23:0.47:0.014, and thus, $Li[Li_{0.30}Ni_{0.23}M_{0.47}Al_{0.014}]O_2$ was obtained. Subsequently, using the positive electrode active material thus prepared, a three-electrode beaker cell 12 was fabricated in the same manner as described in Example 1, and using the resultant cell, the charge-discharge tests were conducted to obtain test results.

Example 13

A positive electrode active material was prepared in a similar manner to that described in Example 1, except that $Li_2CO_3$, the Ni—Mn composite hydroxide, and $ZrO_2$ were mixed so that the mole ratio of the elements Li:Ni:Mn:Zr became 1.3:0.23:0.47:0.0035, and thus, $Li[Li_{0.30}Ni_{0.23}Mn_{0.47}Zr_{0.0035}]O_2$ was obtained. Subsequently, using the positive electrode active material thus prepared, a three-electrode beaker cell 13 was fabricated in the same manner as described in Example 1, and using the resultant cell, the charge-discharge tests were conducted to obtain test results.

Example 14

A positive electrode active material was prepared in a similar manner to that described in Example 1, except that $Li_2CO_3$, the Ni—Mn composite hydroxide, and $ZrO_2$ were mixed so that the mole ratio of the elements Li:Ni:Mn:Zr became 1.3:0.23:0.47:0.007, and thus, $Li[Li_{0.30}Ni_{0.23}Mn_{0.47}Zr_{0.007}]O_2$ was obtained. Subsequently, using the positive electrode active material thus prepared, a three-electrode beaker cell 14 was fabricated in the same manner as described in Example 1, and using the resultant cell, the charge-discharge tests were conducted to obtain test results.

Example 15

A positive electrode active material was prepared in a similar manner to that described in Example 1, except that $Li_2CO_3$, the Ni—Mn composite hydroxide, and $ZrO_2$ were mixed so that the mole ratio of the elements Li:Ni:Mn:Zr became 1.3:0.23:0.47:0.014, and thus, $Li[Li_{0.30}Ni_{0.23}Mn_{0.47}Zr_{0.014}]O_2$ was obtained. Subsequently, using the positive electrode active material thus prepared, a three-electrode beaker cell 15 was fabricated in the same manner as described in Example 1, and using the resultant cell, the charge-discharge tests were conducted to obtain test results.

Example 16

A positive electrode active material was prepared in a similar manner to that described in Example 1, except that $Li_2CO_3$, the Ni—Mn composite hydroxide, and $TiO_2$ were mixed so that the mole ratio of the elements Li:Ni:Mn:Ti became 1.3:0.23:0.47:0.0035, and thus, $Li[Li_{0.30}Ni_{0.23}Mn_{0.47}Ti_{0.0035}]O_2$ was obtained. Subsequently, using the positive electrode active material thus prepared, a three-electrode beaker cell 16 was fabricated in the same manner as described in Example 1, and using the resultant cell, the charge-discharge tests were conducted to obtain test results.

Example 17

A positive electrode active material was prepared in a similar manner to that described in Example 1, except that $Li_2CO_3$, the Ni—Mn composite hydroxide, and $TiO_2$ were mixed so that the mole ratio of the elements Li:Ni:Mn:Ti became 1.3:0.23:0.47:0.007, and thus, $Li[Li_{0.30}Ni_{0.23}Mn_{0.47}Ti_{0.007}]O_2$ was obtained. Subsequently, using the positive electrode active material thus prepared, a three-electrode beaker cell 17 was fabricated in the same manner as described in Example 1, and using the resultant cell, the charge-discharge tests were conducted to obtain test results.

Example 18

A positive electrode active material was prepared in a similar manner to that described in Example 1, except that $Li_2CO_3$, the Ni—Mn composite hydroxide, and $TiO_2$ were mixed so that the mole ratio of the elements Li:Ni:Mn:Ti became 1.3:0.23:0.47:0.014, and thus, $Li[Li_{0.30}Ni_{0.23}Mn_{0.47}Ti_{0.014}]O_2$ was obtained. Subsequently, using the positive electrode active material thus prepared, a three-electrode beaker cell 18 was fabricated in the same manner as described in Example 1, and using the resultant cell, the charge-discharge tests were conducted to obtain test results.

Example 19

A positive electrode active material was prepared in a similar manner to that described in Example 1, except that $Li_2CO_3$, the Ni—Mn composite hydroxide, and $Nb_2O_5$ were mixed so that the mole ratio of the elements Li:Ni:Mn:Nb became 1.3:0.23:0.47:0.0035, and thus, $Li[Li_{0.30}Ni_{0.23}Mn_{0.47}Nb_{0.0035}]O_2$ was obtained. Subsequently, using the positive electrode active material thus prepared, a three-electrode beaker cell 19 was fabricated in the same manner as described in Example 1, and using the resultant cell, the charge-discharge tests were conducted to obtain test results.

Example 20

A positive electrode active material was prepared in a similar manner to that described in Example 1, except that $Li_2CO_3$, the Ni—Mn composite hydroxide, and $Nb_2O_5$ were mixed so that the mole ratio of the elements Li:Ni:Mn:Nb became 1.3:0.23:0.47:0.007, and thus, $Li[Li_{0.30}Ni_{0.23}Mn_{0.47}Nb_{0.007}]O_2$ was obtained. Subsequently, using the positive electrode active material thus prepared, a three-electrode beaker cell 20 xwas fabricated in the same manner as described in Example 1, and using the resultant cell, the charge-discharge tests were conducted to obtain test results.

Example 21

A positive electrode active material was prepared in a similar manner to that described in Example 1, except that $Li_2CO_3$, the Ni—Mn composite hydroxide, and $Nb_2O_5$ were mixed so that the mole ratio of the elements Li:Ni:Mn:Nb became 1.3:0.23:0.47:0.014, and thus, $Li[Li_{0.30}Ni_{0.23}Mn_{0.47}Nb_{0.014}]O_2$ was obtained. Subsequently, using the positive electrode active material thus prepared, a three-electrode beaker cell 21 was fabricated in the same manner as described in Example 1, and using the resultant cell, the charge-discharge tests were conducted to obtain test results.

Example 22

A positive electrode active material was prepared in a similar manner to that described in Example 1, except that Li$_2$CO$_3$, the Ni—Mn composite hydroxide, and WO$_3$ were mixed so that the mole ratio of the elements Li:Ni:Mn:W became 1.3:0.23:0.47:0.0035, and thus, Li[Li$_{0.30}$Ni$_{0.23}$Mn$_{0.47}$W$_{0.0035}$]O$_2$ was obtained. Subsequently, using the positive electrode active material thus prepared, a three-electrode beaker cell 22 was fabricated in the same manner as described in Example 1, and using the resultant cell, the charge-discharge tests were conducted to obtain test results.

Example 23

A positive electrode active material was prepared in a similar manner to that described in Example 1, except that Li$_2$CO$_3$, the Ni—Mn composite hydroxide, and WO$_3$ were mixed so that the mole ratio of the elements Li:Ni:Mn:W became 1.3:0.23:0.47:0.007, and thus, Li[Li$_{0.30}$Ni$_{0.23}$Mn$_{0.47}$W$_{0.007}$]O$_2$ was obtained. Subsequently, using the positive electrode active material thus prepared, a three-electrode beaker cell 23 was fabricated in the same manner as described in Example 1, and using the resultant cell, the charge-discharge tests were conducted to obtain test results.

Example 24

A positive electrode active material was prepared in a similar manner to that described in Example 1, except that Li$_2$CO$_3$, the Ni—Mn composite hydroxide, and WO$_3$ were mixed so that the mole ratio of the elements Li:Ni:Mn:W became 1.3:0.23:0.47:0.014, and thus, Li[Li$_{0.30}$Ni$_{0.23}$Mn$_{0.47}$W$_{0.014}$]O$_2$ was obtained. Subsequently, using the positive electrode active material thus prepared, a three-electrode beaker cell 24 was fabricated in the same manner as described in Example 1, and using the resultant cell, the charge-discharge tests were conducted to obtain test results.

Example 25

A positive electrode active material was prepared in a similar manner to that described in Example 1, except that Li$_2$CO$_3$, the Ni—Mn composite hydroxide, and MoO$_3$ were mixed so that the mole ratio of the elements Li:Ni:Mn:Mo became 1.3:0.23:0.47:0.0035, and thus, Li[Li$_{0.30}$Ni$_{0.23}$Mn$_{0.47}$Mo$_{0.0035}$]O$_2$ was obtained. Subsequently, using the positive electrode active material thus prepared, a three-electrode beaker cell 25 was fabricated in the same manner as described in Example 1, and using the resultant cell, the charge-discharge tests were conducted to obtain test results.

Example 26

A positive electrode active material was prepared in a similar manner to that described in Example 1, except that Li$_2$CO$_3$, the Ni—Mn composite hydroxide, and MoO$_3$ were mixed so that the mole ratio of the elements Li:Ni:Mn:Mo became 1.3:0.23:0.47:0.007, and thus, Li[Li$_{0.30}$Ni$_{0.23}$Mn$_{0.47}$Mo$_{0.007}$]O$_2$ was obtained. Subsequently, using the positive electrode active material thus prepared, a three-electrode beaker cell 26 was fabricated in the same manner as described in Example 1, and using the resultant cell, the charge-discharge tests were conducted to obtain test results.

Example 27

A positive electrode active material was prepared in a similar manner to that described in Example 1, except that Li$_2$CO$_3$, the Ni—Mn composite hydroxide, and MoO$_3$ were mixed so that the mole ratio of the elements Li:Ni:Mn:Mo became 1.3:0.23:0.47:0.014, and thus, Li[Li$_{0.30}$Ni$_{0.23}$Mn$_{0.47}$Mo$_{0.014}$]O$_2$ was obtained. Subsequently, using the positive electrode active material thus prepared, a three-electrode beaker cell 27 was fabricated in the same manner as described in Example 1, and using the resultant cell, the charge-discharge tests were conducted to obtain test results.

Comparative Example 1

A positive electrode active material was prepared in a similar manner to that described in Example 1, except that the Li$_2$CO$_3$ and the Ni—Mn composite hydroxide were mixed so that the mole ratio of the elements Li:Ni:Mn became 1.40:0.20:0.40, and thus, Li[Li$_{0.40}$Ni$_{0.20}$Mn$_{0.40}$]O$_2$ was obtained. Subsequently, using the positive electrode active material thus prepared, a three-electrode beaker cell A was fabricated in the same manner as described in Example 1, and using the resultant cell, the charge-discharge tests were conducted to obtain test results.

Comparative Example 2

A positive electrode active material was prepared in a similar manner to that described in Example 1, except that the Li$_2$CO$_3$ and the Ni—Mn composite hydroxide were mixed so that the mole ratio of the elements Li:Ni:Mn became 1.40:0.15:0.45, and thus, Li[Li$_{0.40}$Ni$_{0.15}$Mn$_{0.45}$]O$_2$ was obtained. Subsequently, using the positive electrode active material thus prepared, a three-electrode beaker cell B was fabricated in the same manner as described in Example 1, and using the resultant cell, the charge-discharge tests were conducted to obtain test results.

Comparative Example 3

A positive electrode active material was prepared in a similar manner to that described in Example 1, except that the Li$_2$CO$_3$ and the Ni—Mn composite hydroxide were mixed so that the mole ratio of the elements Li:Ni:Mn became 1.00:0.50:0.50, and thus, Li[Ni$_{0.50}$Mn$_{0.50}$]O$_2$ was obtained. Subsequently, using the positive electrode active material thus prepared, a three-electrode beaker cell C was fabricated in the same manner as described in Example 1, and using the resultant cell, the charge-discharge tests were conducted to obtain test results.

Comparative Example 4

A positive electrode active material was prepared in a similar manner to that described in Example 1, except that the Li$_2$CO$_3$ and the Ni—Mn composite hydroxide were mixed so that the mole ratio of the elements Li:Ni:Mn became 1.07:0.40:0.53, and thus, Li[Li$_{0.07}$Ni$_{0.40}$Mn$_{0.53}$]O$_2$ was obtained. Subsequently, using the positive electrode active material thus prepared, a three-electrode beaker cell D was fabricated in the same manner as described in Example 1, and using the resultant cell, the charge-discharge tests were conducted to obtain test results.

The results of the initial charge-discharge efficiency measurements and discharge capacity measurements for the cells 1-6 of Examples 1-6 and the cells A-D of Comparative Examples 1-4 are shown in Table 1 below.

The results of the input I-V resistance, output I-V resistance, and input/output power ratio measurements for the cell 4 of Example 4 and the cells 7-27 of Examples 7-27 are shown in Table 2 below.

Figure 2:
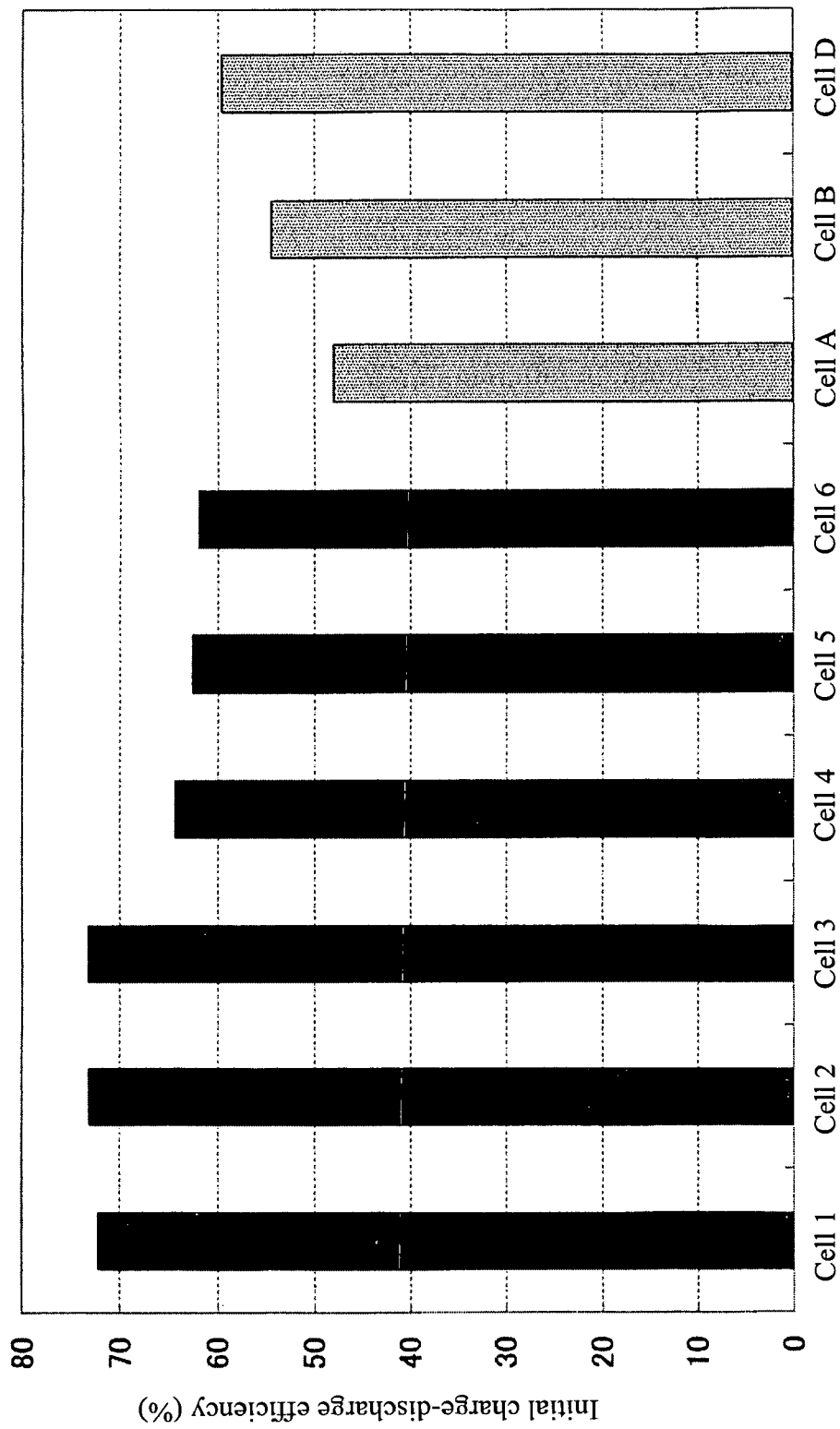
FIG. 2 is a graph illustrating the initial charge-discharge efficiencies of Examples according to the present invention.
Figure 3:
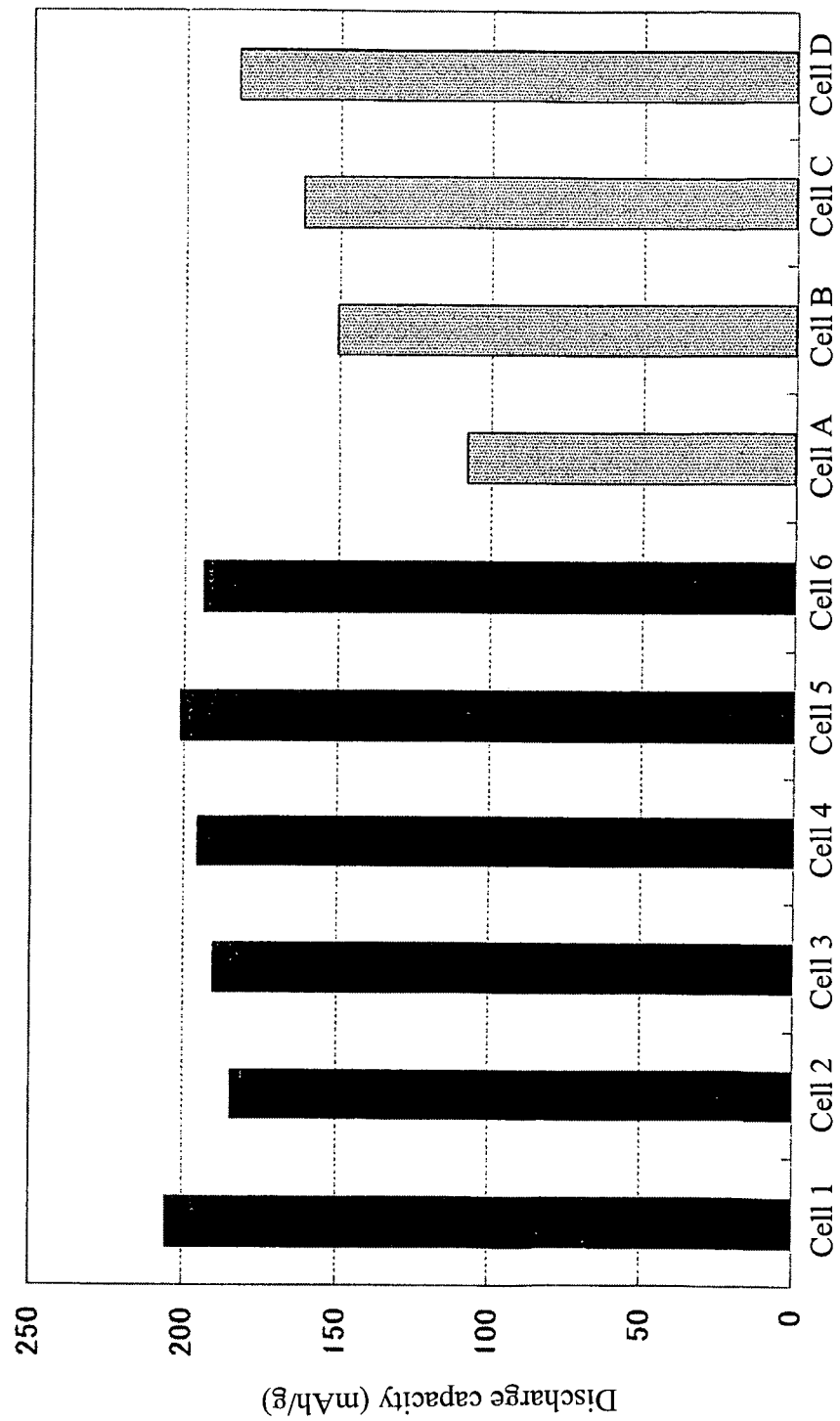
FIG. 3 is a graph illustrating the discharge capacities of Examples according to the present invention.

The initial charge-discharge efficiencies of the cells 1-6 as well as the cells A, B, and D are shown in FIG. 2, and the discharge capacities of the cells 1-6 and the cells A-D are shown in FIG. 3, respectively.

TABLE 1

| | Cell | Composition | Initial charge-discharge efficiency (%) | Discharge capacity (mAh/g) |
|---|---|---|---|---|
| Ex. 1 | 1 | $Li[Li_{0.20}Ni_{0.27}Mn_{0.53}]O_2$ | 72.19 | 205.52 |
| Ex. 2 | 2 | $Li[Li_{0.30}Ni_{0.35}Mn_{0.35}]O_2$ | 73.09 | 184.40 |
| Ex. 3 | 3 | $Li[Li_{0.30}Ni_{0.30}Mn_{0.40}]O_2$ | 73.14 | 190.43 |
| Ex. 4 | 4 | $Li[Li_{0.30}Ni_{0.23}Mn_{0.47}]O_2$ | 61.29 | 195.72 |
| Ex. 5 | 5 | $Li[Li_{0.30}Ni_{0.18}Mn_{0.52}]O_2$ | 62.52 | 201.08 |
| Ex. 6 | 6 | $Li[Li_{0.30}Ni_{0.14}Mn_{0.56}]O_2$ | 61.92 | 194.11 |
| Comp. Ex. 1 | A | $Li[Li_{0.40}Ni_{0.20}Mn_{0.40}]O_2$ | 47.93 | 107.77 |
| Comp. Ex. 2 | B | $Li[Li_{0.40}Ni_{0.15}Mn_{0.45}]O_2$ | 54.43 | 150.62 |
| Comp. Ex. 3 | C | $Li[Ni_{0.50}Mn_{0.50}]O_2$ | 81.13 | 161.65 |
| Comp. Ex. 4 | D | $Li[Li_{0.07}Ni_{0.40}Mn_{0.53}]O_2$ | 59.53 | 182.67 |

TABLE 2

| | Cell | Added element | Amount added (mol. %) | Input I-V resistance (Ω) | Output I-V resistance (Ω) | Input/output power ratio |
|---|---|---|---|---|---|---|
| Ex. 4 | 4 | none | 0 | 7.84 | 8.61 | 0.495 |
| Ex. 7 | 7 | Mg | 0.5 | 9.31 | 10.75 | 0.719 |
| Ex. 8 | 8 | | 1.0 | 7.21 | 7.80 | 0.639 |
| Ex. 9 | 9 | | 2.0 | 8.57 | 9.82 | 0.672 |
| Ex. 10 | 10 | Al | 0.5 | 8.60 | 9.56 | 0.672 |
| Ex. 11 | 11 | | 1.0 | 8.80 | 9.80 | 0.681 |
| Ex. 12 | 12 | | 2.0 | 11.8 | 13.6 | 0.687 |
| Ex. 13 | 13 | Zr | 0.5 | 7.12 | 7.77 | 0.689 |
| Ex. 14 | 14 | | 1.0 | 7.52 | 8.13 | 0.662 |
| Ex. 15 | 15 | | 2.0 | 8.13 | 8.64 | 0.624 |
| Ex. 16 | 16 | Ti | 0.5 | 7.04 | 7.72 | 0.666 |
| Ex. 17 | 17 | | 1.0 | 7.16 | 7.68 | 0.653 |
| Ex. 18 | 18 | | 2.0 | 6.49 | 6.74 | 0.603 |
| Ex. 19 | 19 | Nb | 0.5 | 7.21 | 7.89 | 0.699 |
| Ex. 20 | 20 | | 1.0 | 5.71 | 5.85 | 0.609 |
| Ex. 21 | 21 | | 2.0 | 6.28 | 6.62 | 0.679 |
| Ex. 22 | 22 | W | 0.5 | 7.10 | 8.04 | 0.736 |
| Ex. 23 | 23 | | 1.0 | 5.60 | 5.83 | 0.677 |
| Ex. 24 | 24 | | 2.0 | 5.29 | 5.32 | 0.633 |
| Ex. 25 | 25 | Mo | 0.5 | 6.34 | 6.57 | 0.646 |
| Ex. 26 | 26 | | 1.0 | 8.71 | 9.78 | 0.765 |
| Ex. 27 | 27 | | 2.0 | 5.74 | 5.85 | 0.624 |

The results shown in Table 1 and FIGS. 2 and 3 clearly demonstrate that the cells 1-6 of Examples 1-6, each of which employed the lithium-nickel-manganese composite oxide having a composition according to the present invention as the positive electrode active material, achieved superior initial charge-discharge efficiencies and discharge capacities than the cells A-D of Comparative Examples 1-4.

FIG. 1 shows a Li—Ni—Mn three-phase diagram illustrating the lithium-nickel-manganese composite oxides of the cells 1-6 of Examples 1-6 as well as the cells A-D of Comparative Examples 1-4. The lithium-nickel-manganese composite oxide of the present invention has a composition defined by the region bounded by the four straight lines x=0.4, x=(1−2y)/3, y/z=¼, and y/z=1/1 (not including any composition that falls on the lines x=0.4 and x=(1−2y)/3).

By comparing the Example cells 1-6 with the Comparative Example cell D, which uses the conventional lithium-nickel-manganese composite oxide reported in U.S. Patent Application Publication No. 2003/0108793A1, it has been shown that the initial charge-discharge efficiency and the discharge capacity are improved by the compositions in which the amount x of lithium contained in the 3b sites that contain transition metals is greater than (1−2y)/3, in other words, under the condition x>(1−2y)/3.

Moreover, by comparing the Example cells 1-6 with the Comparative Example cells A and B, in which the amount x of the lithium is 0.4, it has been shown that the initial charge-discharge efficiency and the discharge capacity are poor when the amount of the lithium is 0.4. Therefore, according to the present invention, it has been shown that the amount x of Li in the 3b sites that contain the transition metals should be less than 0.4.

Furthermore, as is clear from the comparison between the cells 1 to 6 of Examples and the cell C of Comparative Example, it has been shown that the effect of improving the discharge capacity as achieved by the present invention cannot be obtained when Li is not contained in the 3b sites that contain the transition metals.

In the present invention, the advantageous effect is especially evident when utilizing the capacity range of $Mn^{4+/3+}$ after the lithium extraction from the 3b sites. Accordingly, it is more advantageous when the amount z of Mn is larger than the amount y of Ni. Nevertheless, if the amount of Mn is too large, irreversible capacity increases, and the initial charge-discharge efficiency reduces. Therefore, it is preferable that the ratio y/z of Ni/Mn be less than 1 but greater than ¼.

Figure 4:
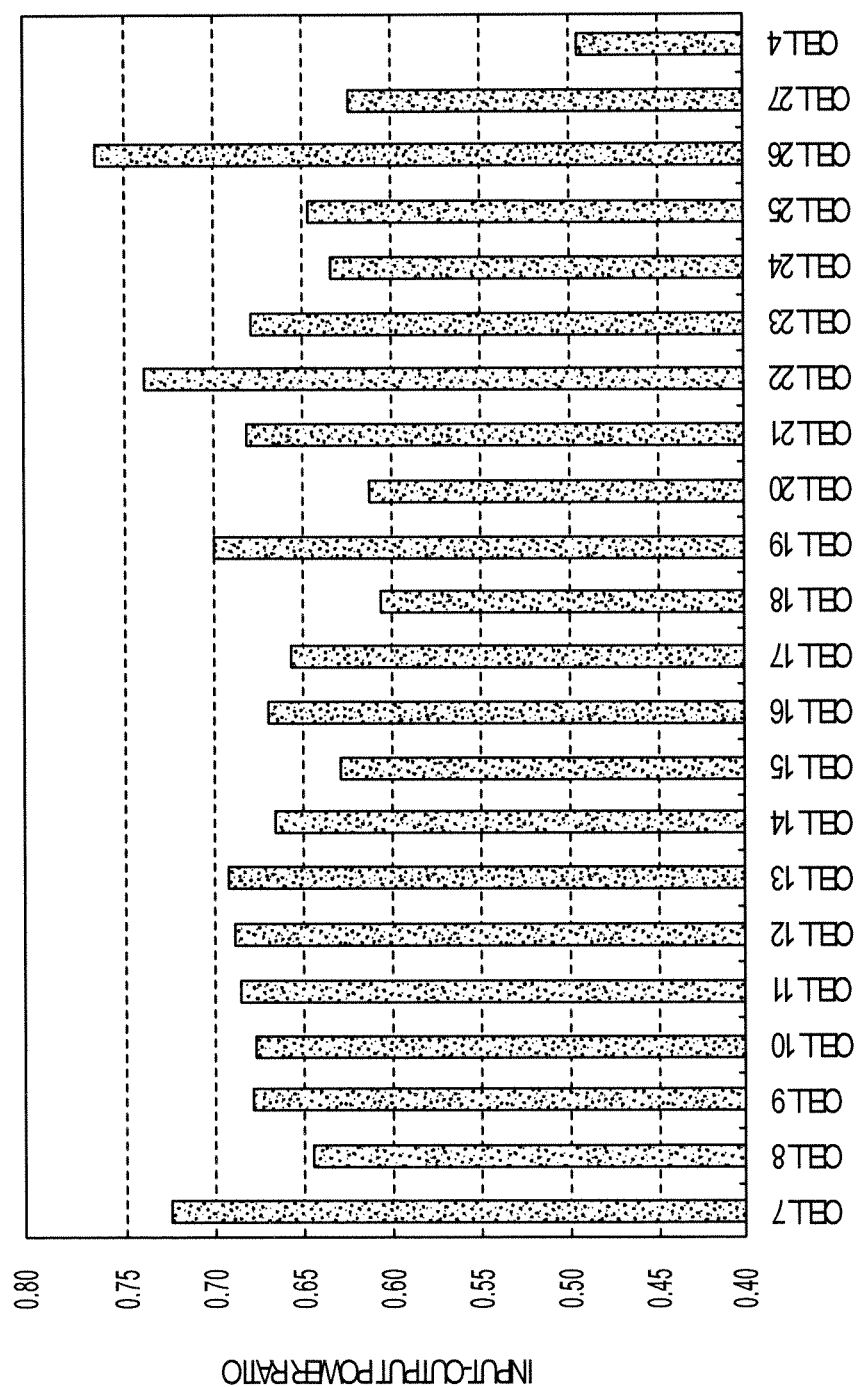
FIG. 4 is a graph illustrating the input/output power ratios of Examples according to the present invention.

As clearly seen from the results shown in Table 2 and FIG. 4, the cells 7-27 of Examples 7-27 according to the present invention, each of which uses as the positive electrode active material a lithium-nickel-manganese composite oxide that contains at least one metal element having a valency of from 2 to 6, exhibit input/output power ratios that are closer to 1 than the input/output power ratio of the cell 4 of Example 4, which does not contain the additive metal element. Thus, the cells 7-27 of Examples 7-27 provide improvements in the balance between input power and output power.

Figure 5:
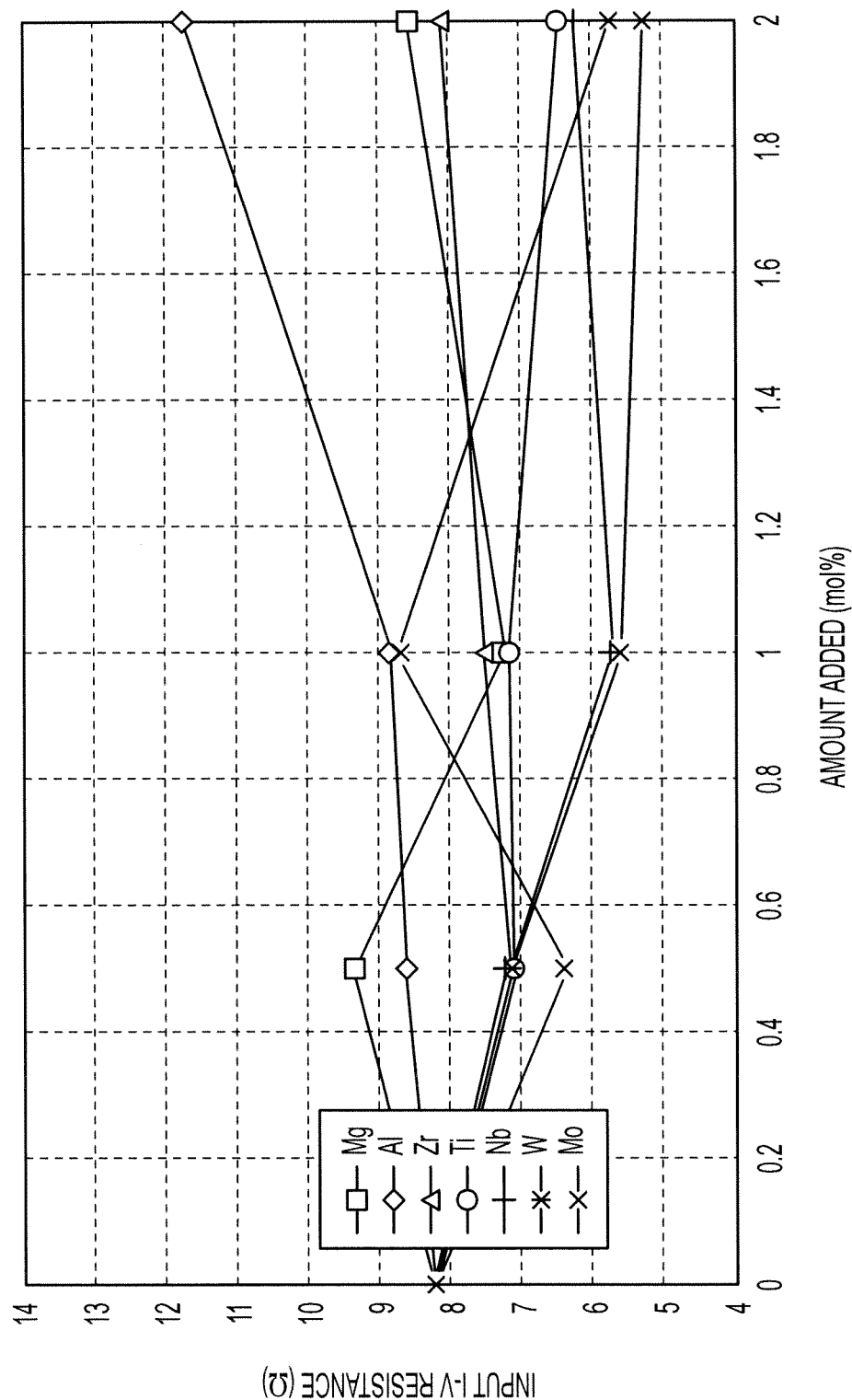
FIG. 5 is a graph illustrating the input I-V resistances of Examples according to the present invention.
Figure 6:
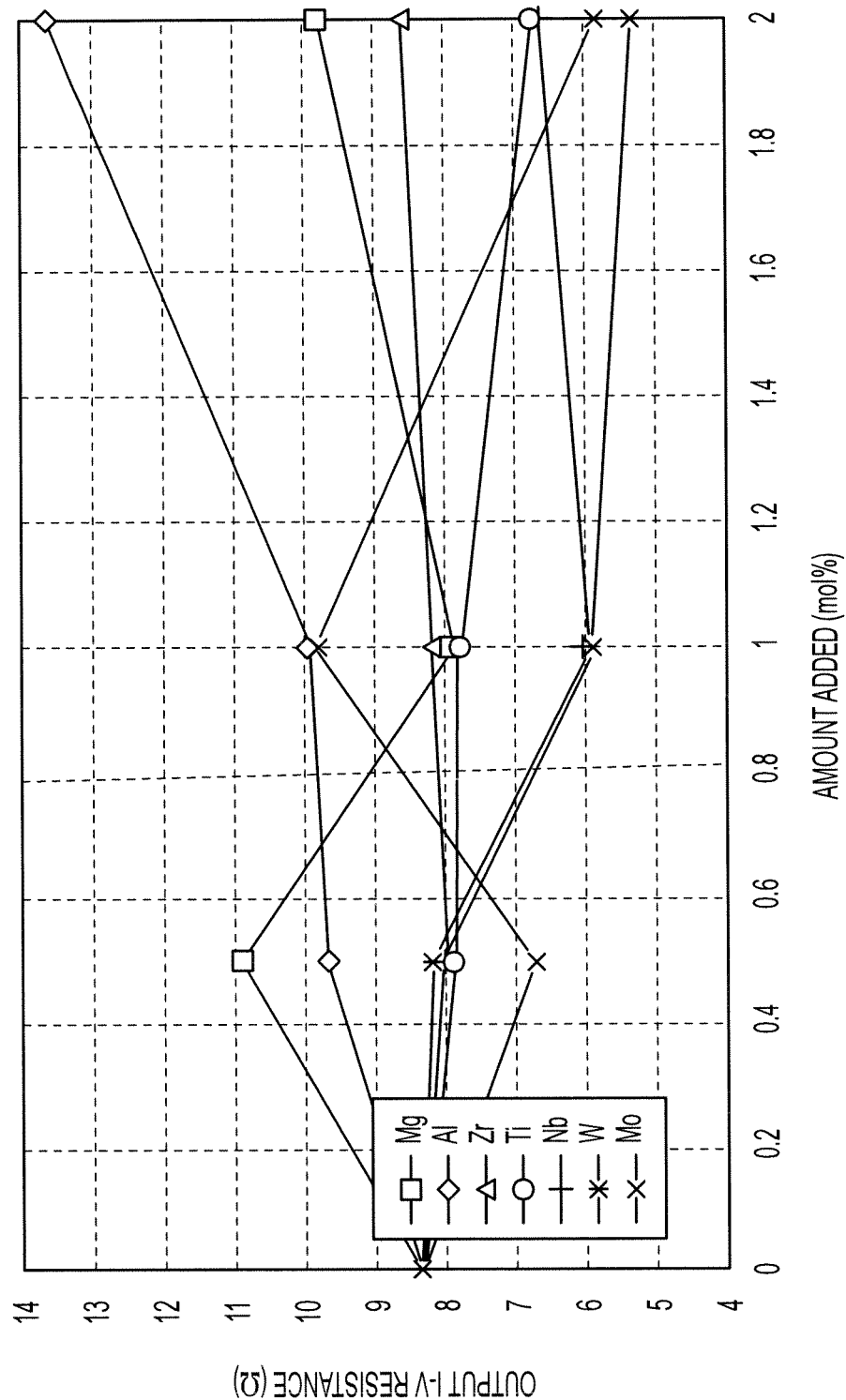
FIG. 6 is a graph illustrating the output I-V resistances of Examples according to the present invention.

Moreover, as clearly seen from the results shown in Table 2 and FIGS. 5 and 6, the cells 13-27 of Examples 13-27, each of which uses as the positive electrode active material a lithium-nickel-manganese composite oxide that contains at least one metal element having a valency of from 4 to 6, exhibit considerably lower input I-V resistances and output I-V resistances than that of the cell 4 of Example 4, which does not contain the additive metal element and than those of the cells 7-12 of Examples 7-12, which contain at least one metal element having a valency of from 2 to 3.

It is believed that the reason why the use of the above-specified lithium-nickel-manganese composite oxide according to the present invention achieves excellent initial charge-discharge efficiency and discharge capacity is as follows, although the details are not yet clear. It is believed that, in each of the conventional lithium-nickel-manganese composite oxides $xLi[Ni_{0.5}Mn_{0.5}]O_2+(1-x)Li_2MnO_3$ and $Li[Li_{(1-2y)/3}Ni_xMn_{(2-x)/3}])_2$, the valencies of the Ni and the Mn in a completely discharged state are exclusively 2 and 4, respectively, and almost no oxygen holes are present. In the composition of the present invention, for example, in the case of $Li[Li_{0.30}Ni_{0.30}Mn_{0.40}]O_2$ of the cell 3, it is understood that electroneutrality cannot be maintained if the valencies of Ni and Mn are 2 and 4, respectively. Even if Ni is oxidized to a valency of 3, electroneutrality is not reached. Also, it is not believed that the valency of Mn is in an oxidation state higher than a valency of 4 at 4.6 V (vs. Li/Li+ in the initial charge. Accordingly, electroneutrality is maintained because of oxygen defects even before the battery is subjected to the initial charge, and as a result, the electrochemical irreversible capacity produced during the initial charge is small. It is believed that the initial charge-discharge efficiency is improved in this way. Also, the reason why the discharge capacity becomes higher than that of the conventional active materials at that time is believed to be as follows, although the details are not yet clear. Since the lithium-nickel-manganese composite oxide of the invention contains Li excessively, the extraction of Li from the 3a sites is easier than the conventional composition $xLi[Ni_{0.5}Mn_{0.5}]O_2+(1-x)Li_2MnO_3$ that is represented as a solid solution of $Li[Ni_{0.5}Mn_{0.5}]O_2$ and $Li_2MnO_3$, and as a result, a larger capacity of $Mn^{4+/3+}$ can be obtained at a discharge process after the initial charging.

It is believed that the reason why the power balance between input power and output power is improved according to the present invention by adding at least one metal element having a valency of from 2 to 6 to the above-specified lithium-nickel-manganese composite oxide is as follows, although the details are not yet clear. In order to improve the power balance between input power and output power, it is necessary to reduce the OCP. In order to reduce the OCP at 50% SOC with the lithium-nickel-manganese composite oxide of the present invention, the capacity of $Mn^{4+/3+}$ produced through the extraction of lithium from the 3b sites during the initial charge should be increased relative to the total capacity. It is believed that the added metal element according to the present invention exists without being involved in the charge-discharge processes, but the presence of such a metal element in the vicinity of the nickel and manganese, which are involved in charge-discharge processes, is believed to influence the electronic state. For example, when a metal element having a valency of 3 is added to the lithium-nickel-manganese composite oxide, the valency of the nickel, which is believed to have been 2 in a discharged state, is shifted to a valency greater than 2 due to the influence from the nearby metal element whereas the valency of the manganese, which is believed to have been 4 in a discharged state, is shifted to a valency lower than 4. As a result, the proportion of the capacity originating from the redox reaction of the nickel reduces, and on the contrary, the proportion of the capacity originating from the redox reaction of the manganese increases. Consequently, the OCP reduces. On the other hand, when a metal element having a valency of 6 is added to the lithium-nickel-manganese composite oxide, the valency of the nickel is increased to a valency higher than 2 due to the influence from the nearby metal element, and the valency of the manganese is also increased to a valency higher than 4. Nevertheless, in the charge-discharge reactions of the present invention, it is believed that the manganese does not undergo an oxidized reaction such as to shift its valency from 4 to 5, and it is not involved in the charge-discharge processes. As a result, only the capacity of the nickel reduces, and the relative proportion of the capacity of the manganese increases with respect to the total capacity. It is believed that, by these processes, the addition of the metal element(s) to the lithium-nickel-manganese composite oxide serves to reduce the OCP and to improve the power balance between input power and output power.

In addition, it is believed that the reason why the input I-V resistance and the output I-V resistance are reduced by adding, according to the present invention, at least one metal element having a valency of from 4 to 6 to the above-specified lithium-nickel-manganese composite oxide is as follows, although the details are not yet clear. It is highly likely that such a metal element having a valency of 4 or greater is present outside the crystal lattice because the metal element is not easily substituted for the nickel or manganese in the crystal. Accordingly, it is believed that the addition of such an element having a valency of 4 or greater inhibits the crystal growth during the calcining, so the crystallite size tends to be small. As a result, the diffusion of lithium inside the active material that is associated with charge-discharge reactions becomes easier, and consequently the I-V resistances reduce.

As has been described, the use of the $Li(LiNiMn)O_2$ composite oxide having a prescribed composition according to the present invention as the positive electrode active material makes it possible to improve the initial charge-discharge efficiency and discharge capacity and thus to provide a battery that exhibits excellent regenerative power characteristics.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and is not intended to limit the invention as defined by the appended claims and their equivalents.

This application claims priority of Japanese Patent Application Nos. 2006-031166 and 2006-093957 filed Feb. 8, 2006 and Mar. 30, 2006, respectively, each of which is incorporated herein by reference.

What is claimed is:

1. A non-aqueous electrolyte secondary battery comprising:
   a positive electrode containing a positive electrode active material;
   a negative electrode containing a negative electrode active material; and
   a non-aqueous electrolyte, wherein
   the positive electrode active material comprises a lithium-nickel-manganese composite oxide having a hexagonal layered rock-salt structure that belongs to the space group R-3m and containing lithium in 3b sites that contain transition metals, the lithium-nickel-manganese composite oxide being represented by the molecular formula $Li[Li_xNi_yMn_zM_b]O_{2-a}$ where: $0.2<x<0.4$, $0.12<y<0.5$, $0.3<z<0.62$, and $0 \leq a<0.5$; M is at least one metal element having a valency of from 2 to 6; and the variables x, y, z, and b satisfy the expressions $x>(1-2y)/3$, $1/4 \leq y/z \leq 1.0$, $0<b/(y+z) \leq 0.1$, and $1.0 \leq x+y+z+b \leq 1.1$.

2. The non-aqueous electrolyte secondary battery according to claim 1, wherein the capacity ratio of the negative electrode to the positive electrode (negative electrode charge capacity/positive electrode charge capacity) is 1.0 or greater when the battery is charged until the potential of the positive electrode reaches 4.45 V (vs. $Li/Li^+$) or higher.

* * * * *